United States Patent
Coldwate et al.

(10) Patent No.: US 10,563,590 B2
(45) Date of Patent: Feb. 18, 2020

(54) SYSTEM AND METHOD OF GAS TURBINE ENGINE SHAFT COOLING

(71) Applicant: Hamilton Sundstrand Corporation, Charlotte, NC (US)

(72) Inventors: Joseph Kenneth Coldwate, Roscoe, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 712 days.

(21) Appl. No.: 15/158,731

(22) Filed: May 19, 2016

(65) Prior Publication Data
US 2017/0335772 A1 Nov. 23, 2017

(51) Int. Cl.
| | |
|---|---|
| F02C 7/277 | (2006.01) |
| F02C 7/268 | (2006.01) |
| F02C 7/26 | (2006.01) |
| F02C 7/275 | (2006.01) |
| F02C 7/262 | (2006.01) |
| F02C 3/04 | (2006.01) |
| F02C 9/00 | (2006.01) |

(52) U.S. Cl.
CPC .............. *F02C 7/262* (2013.01); *F02C 3/04* (2013.01); *F02C 9/00* (2013.01); *F02C 7/26* (2013.01); *F02C 7/268* (2013.01); *F02C 7/275* (2013.01); *F02C 7/277* (2013.01); *F05D 2220/32* (2013.01); *F05D 2260/20* (2013.01); *F05D 2260/85* (2013.01); *F05D 2260/96* (2013.01); *F05D 2270/114* (2013.01)

(58) Field of Classification Search
CPC .... F02C 7/26; F02C 7/268; F02C 7/27; F02C 7/275; F02C 7/277; F05D 2220/50; F05D 2260/85; F05D 2260/96; F01D 25/34; F01D 25/36
See application file for complete search history.

(56) References Cited

U.S. PATENT DOCUMENTS

| | | | |
|---|---|---|---|
| 3,098,626 A * | 7/1963 | Messinger | ............... F02C 7/277 244/53 A |
| 4,003,200 A | 1/1977 | Xerlauth | |
| 4,733,529 A * | 3/1988 | Nelson | .................... F01D 21/06 415/1 |
| 8,776,530 B2 | 7/2014 | Shirooni et al. | |
| 8,820,046 B2 | 9/2014 | Ross et al. | |
| 8,893,510 B2 | 11/2014 | Tham et al. | |
| 9,151,182 B2 | 10/2015 | Miller | |

(Continued)

FOREIGN PATENT DOCUMENTS

JP 2002371806 A 12/2002

OTHER PUBLICATIONS

European Search Report from the European Patent Office for EP Application No. 17171602.0 dated Oct. 13, 2017; 7 pages.

*Primary Examiner* — Gerald L Sung
*Assistant Examiner* — James P McGlynn
(74) *Attorney, Agent, or Firm* — Cantor Colburn LLP

(57) ABSTRACT

A method of cooling a shaft of a gas turbine engine includes moving a control valve towards a position that inhibits fluid flow from a high pressure air source to an air turbine starter and enables fluid flow from a blower motor to the air turbine starter, in response to a gas turbine engine shutdown. The method further includes operating the blower motor to provide air to the air turbine starter.

9 Claims, 3 Drawing Sheets

(56) References Cited

U.S. PATENT DOCUMENTS

| | | | |
|---|---|---|---|
| 9,664,070 B1* | 5/2017 | Clauson | F01D 25/36 |
| 2010/0326085 A1* | 12/2010 | Veilleux | B64C 27/14 |
| | | | 60/778 |
| 2011/0232294 A1 | 9/2011 | Ross et al. | |
| 2013/0031912 A1 | 2/2013 | Finney et al. | |
| 2013/0091850 A1 | 4/2013 | Francisco | |
| 2014/0373518 A1* | 12/2014 | Manneville | F01D 19/02 |
| | | | 60/327 |
| 2014/0373553 A1 | 12/2014 | Zaccaria et al. | |
| 2014/0373554 A1* | 12/2014 | Pech | F02C 7/277 |
| | | | 60/788 |
| 2016/0363228 A1* | 12/2016 | Hallisey | F16K 11/044 |
| 2018/0016988 A1* | 1/2018 | Short | F01D 17/145 |

* cited by examiner

SYSTEM AND METHOD OF GAS TURBINE ENGINE SHAFT COOLING

BACKGROUND

Gas turbine engines are commonly provided with multiple shafts to rotate various internal components of the gas turbine engine. Shutdown of the gas turbine engine may result in uneven cooling of at least one of the multiple shafts. The uneven cooling at least one of the multiple shafts may result in imbalances for deformation of at least one of the multiple shafts.

BRIEF DESCRIPTION

According to an embodiment of the present disclosure, a gas turbine engine shaft cooling system is provided. The gas turbine engine shaft cooling system includes an air turbine starter, a control valve, and a controller. The air turbine starter is operably connected to a gas turbine engine. The blower motor is operably connected to the air turbine starter through a control valve. The control valve configured to selectively port airflow from at least one of a blower motor and a high pressure air source to the air turbine starter. The controller is in communication with the blower motor and the control valve. The controller being configured to operate the blower motor and the control valve to enable airflow from the blower motor to the air turbine starter to cause at least one shaft of the gas turbine engine to rotate while a gas turbine engine is being shutdown.

According to another embodiment of the present disclosure, a gas turbine engine shaft cooling system is provided. The gas turbine engine shaft cooling system includes an air turbine starter, a control valve, and a controller. The air turbine starter is operably connected to a gas turbine engine. The control valve is fluidly connected to the air turbine starter, a high pressure air source, and a blower motor. The control valve is movable between a first position, a second position, and a third position. The first position inhibits fluid flow to the air turbine starter from the high pressure air source and the blower motor. The second position enables fluid flow from the high pressure air source to the air turbine starter and inhibits fluid flow from the blower motor to the air turbine starter. The third position inhibits fluid flow from the high pressure air source to the air turbine starter and enables fluid flow from the blower motor to the air turbine starter. The controller is in communication with the blower motor and the control valve. The controller is configured to command the blower motor to operate and command the control valve to move towards the third position to provide high pressure air to the air turbine starter to rotate at least one shaft of the gas turbine engine at a rotational speed less than a threshold rotational speed, in response to an operating parameter associated with a gas turbine engine shutdown.

According to yet another embodiment of the present disclosure, a method of cooling a shaft of a gas turbine engine is provided. The method includes moving a control valve towards a position that inhibits fluid flow from a high pressure air source to an air turbine starter and enables fluid flow from a blower motor to the air turbine starter, in response to a gas turbine engine shutdown. The method further includes operating the blower motor to provide air to the air turbine starter.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
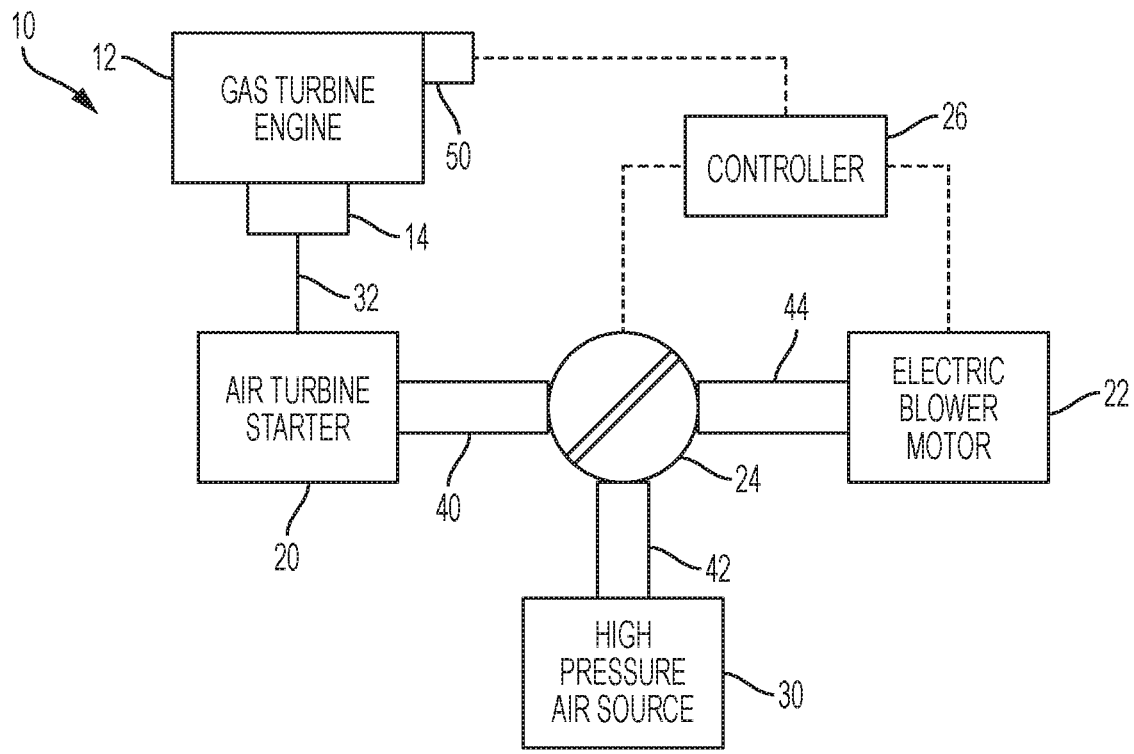
FIG. 1 is a schematic of a gas turbine engine shaft cooling system having a control valve in a first position.
Figure 2:
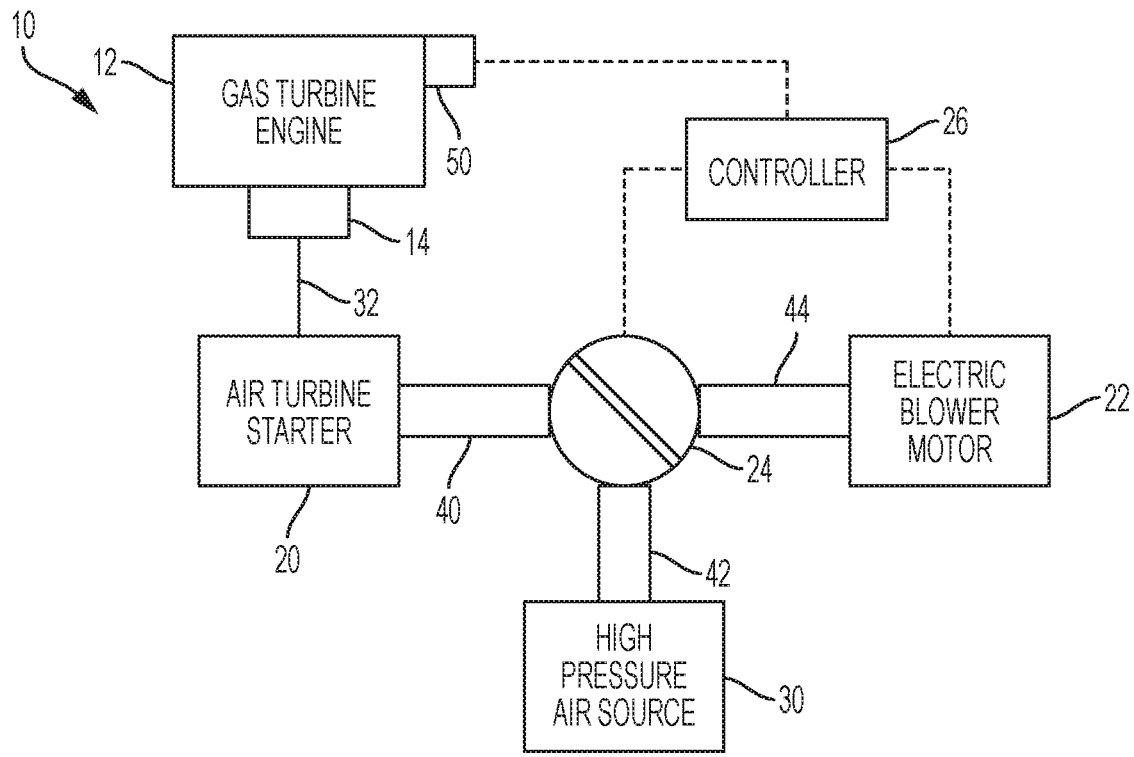
FIG. 2 is a schematic of the gas turbine engine shaft cooling system having the control valve in a second position.
Figure 3:
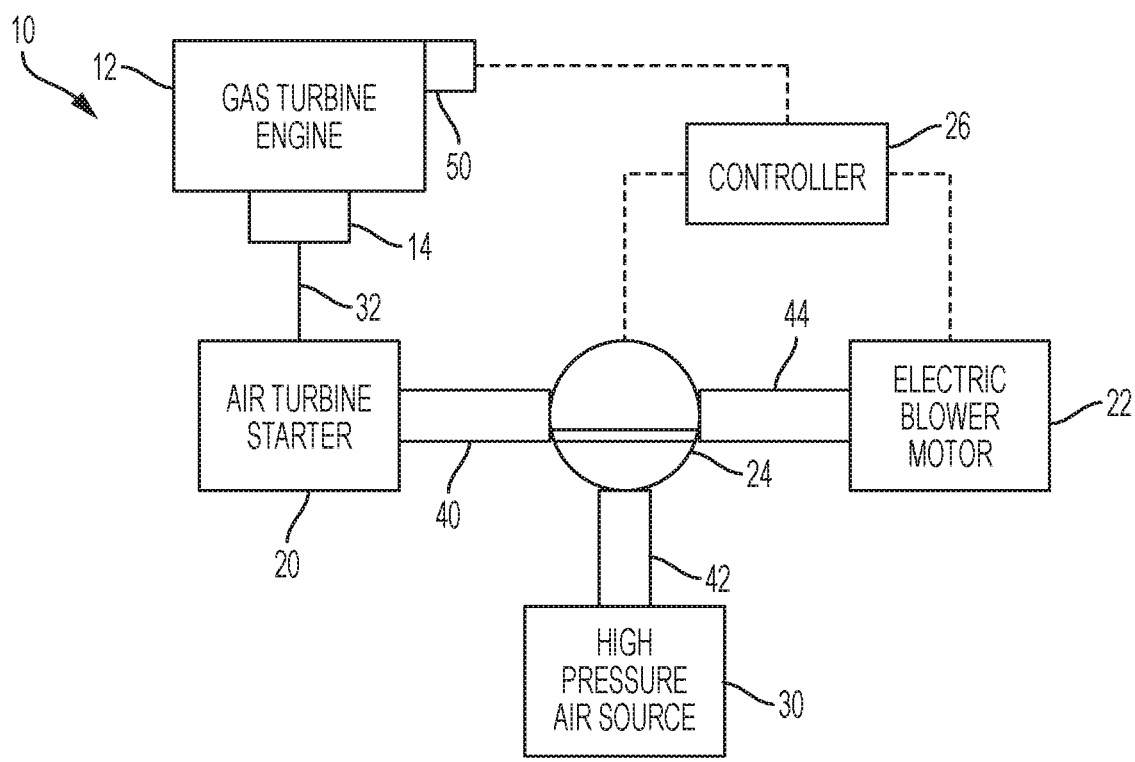
FIG. 3 is a schematic of the gas turbine engine shaft cooling system having the control valve and a third position.

Referring to FIGS. 1-3, a schematic of a gas turbine engine shaft cooling system 10 is shown. The gas turbine engine shaft cooling system 10 may be provided with an aircraft that includes a gas turbine engine 12. The gas turbine engine 12 includes a plurality of rotatable sections that are interconnected by at least one shaft. For example, the gas turbine engine 12 may include a low-pressure compressor section and a low-pressure turbine section that are interconnected by a low-pressure shaft or a low pressure spool. The gas turbine engine 12 may include a high pressure compressor section and a high pressure turbine section that are interconnected by a high pressure shaft or a high pressure spool.

A gearbox 14 may be operably connected to the gas turbine engine 12. The gearbox 14 may be mechanically coupled to at least one of the low-pressure shaft/low pressure spool and the high pressure shaft/high pressure spool. The gearbox 14 may enable various accessories to be operably connected to the gas turbine engine 12. The gearbox 14 enables the various accessories to be driven by the gas turbine engine 12. The various accessories may include a generator, an oil pump, a power takeoff, a starter, a propeller, etc.

At least one of these shafts, i.e. the low pressure shaft/low pressure spool or the high pressure shaft/high pressure spool, rotates during operation of the gas turbine engine 12. After the gas turbine engine 12 is shut down, the gas turbine engine 12 winds down and eventually at least one of these shafts ceases rotation. As the heat from operation of the gas turbine engine 12 is released or soaks back after shutdown, at least one of the shafts may cool unevenly. The uneven cooling of at least one of these shafts may cause imbalances in the rotating components coupled to at least one of these shafts and may impact clearances between rotating and stationary components of the gas turbine engine 12.

The gas turbine engine shaft cooling system 10 causes at least one shaft of the gas turbine engine 12 to rotate for a time period after the gas turbine engine 12 is shut down to encourage substantially even cooling of at least one shaft of the gas turbine engine 12. The gas turbine engine shaft cooling system 10 includes an air turbine starter 20, a blower motor 22, a control valve 24, and a controller 26.

The air turbine starter 20 is mounted to the gearbox 14. The air turbine starter 20 is configured to rotate at least one shaft of the gas turbine engine 12 to aid in starting the gas turbine engine 12. The air turbine starter 20 receives air from a high pressure air source 30 and causes a shaft 32 of the air turbine starter 20 to rotate the gearbox 14. The rotating of the shaft 32 leads to the rotation of a component of the gearbox 14 rotates at least one of the low-pressure shaft/low pressure spool and the high pressure shaft/high pressure spool up to a desired speed prior to the ignition of an engine combustor. In at least one embodiment, the air turbine starter 20 rotates the high pressure shaft/high pressure spool up to the desired speed. The high pressure air source 30 may be an aircraft pneumatic source, an auxiliary power unit, an external air cart, another operating engine, or the like.

The high pressure air source 30 may require a substantial amount of power to operate. The substantial amount of power may not be available after the gas turbine engine 12 is shut down. Additionally, the high pressure air source 30 may not be fuel-efficient. As such, the blower motor 22 is operated when the gas turbine engine 12 is shut down. The blower motor 22 may be an electric blower motor that is electrically connected to a power source of the aircraft that incorporates the gas turbine engine 12. The power source may be an energy storage device such as a battery, an ultra-capacitor, or the like that is disposed within the aircraft that incorporates the gas turbine engine 12.

The blower motor 22 is configured to provide high pressure air to the air turbine starter 20. The high pressure air may be provided by the blower motor 22 at a low volume to cause the air turbine starter 20 to rotate at least one shaft of the gas turbine engine 12. The high pressure, low volume air provided by the blower motor 22 may cause at least one shaft of the gas turbine engine 12 to rotate at a predetermined rotational speed that is approximately within the range of 0.1-10 revolutions per minute while the gas turbine engine 12 is shut down.

The control valve 24 is fluidly connected to the air turbine starter 20, the blower motor 22, and the high pressure air source 30. The control valve 24 is fluidly connected to the air turbine starter 20 through a first duct 40. The control valve 24 is fluidly connected to the high pressure air source through a second duct 42. The control valve 24 is fluidly connected to the blower motor 22 through a third duct 44.

The control valve 24 is configured to selectively fluidly connect or selectively enable airflow from the blower motor 22 or the high pressure air source 30 to the air turbine starter 20. The control valve 24 is movable between a first position, a second position, and a third position. As shown in FIG. 1, the first position is a position of the control valve 24 that inhibits fluid flow to the air turbine starter 20 from the high pressure air source 30 and the blower motor 22. The first position of the control valve 24 may correspond to a position in which the gas turbine engine 12 is operating and not shut down.

As shown in FIG. 2, the second position is a position of the control valve 24 that enables or selectively ports fluid flow from the high pressure air source 30 to the air turbine starter 20 and inhibits fluid flow from the blower motor 22 to the air turbine starter 20. The second position of the control valve 24 may correspond to a position in which the high pressure air source 30 is enabled to start the gas turbine engine 12.

As shown in FIG. 3, the third position is a position of the control valve 24 that inhibits fluid flow from the high pressure air source 30 to the air turbine starter 20 and enables or selectively ports fluid flow from the blower motor 22 to the air turbine starter 20. The third position of the control valve 24 may correspond to a position in which the gas turbine engine 12 is shut down and high pressure, low volume air is provided by the blower motor 22 to the air turbine starter 20 to rotate at least one shaft of the gas turbine engine 12.

The controller 26 is provided to monitor and control various components of the gas turbine engine shaft cooling system 10. The controller 26 may be a standalone controller or may be part of a larger aircraft control or monitoring system. The controller 26 is electrically connected to and is in communication with the air turbine starter 20, the blower motor 22, and the control valve 24. In at least one embodiment, the controller 26 is in communication with a temperature sensor 50. The temperature sensor 50 is positioned on or within the gas turbine engine 12 to measure a temperature of the gas turbine engine 12. In at least one embodiment, the temperature sensor 50 is positioned to measure an internal temperature of the gas turbine engine 12 proximate the high pressure shaft/high pressure spool of the gas turbine engine 12.

The controller 26 is configured to or programmed to command position changes of the control valve 24 and operation of at least one of the blower motor 22 and the high pressure air source 30 to provide high pressure air to the air turbine starter 20. As shown in FIG. 1, the gas turbine engine shaft cooling system 10 is shown with the control valve 24 in the first position prior to the gas turbine engine 12 being shut down.

As shown in FIG. 3, the gas turbine engine shaft cooling system 10 is shown with the control valve 24 in the third position in response to a gas turbine engine 12 being shut down. A gas turbine engine shutdown may be indicated by various operating parameters. The various operating parameters associated with a gas turbine engine shutdown may include a gas turbine engine rotational speed being less than a threshold operating gas turbine rotational speed, a gas turbine engine temperature being greater than a threshold gas turbine engine temperature while the gas turbine engine rotational speed is less than the threshold operating gas turbine rotational speed, or a time since a gas turbine engine shutdown request has been received.

The controller 26 is configured to command the control valve 24 to be moved towards the third position from at least one of the first position or the second position in response to a gas turbine engine shutdown request or operating parameters associated with a gas turbine engine shutdown request being received by the controller 26. The controller 26 is configured to command the blower motor 22 to operate and provide high pressure air to the air turbine starter 20. The provision of high pressure air to the air turbine starter 20 by the blower motor 22 causes at least one shaft of the gas turbine engine 12 to rotate at a rotational speed less than a threshold rotational speed, i.e. a rotational speed less than 10 revolutions per minute.

The controller 26 may command the blower motor 22 to be operated for a predetermined time period, i.e. 1-2 hours. The blower motor 22 may be continuously operated to continuously rotate at least one shaft of the gas turbine engine 12 during the predetermined time period while the gas turbine engine 12 cools. The controller 26 commands the blower motor 22 to cease operation and commands the control valve 24 to move towards the first position or the second position, in response to the expiry of the predetermined time period.

The controller 26 may command that the blower motor 22 be operated intermittently to intermittently rotate at least one shaft of the gas turbine engine 12 during predetermined time intervals. For example, the blower motor 22 may provide high pressure air to the air turbine starter 20 for a first time interval. During the first time interval at least one shaft of the gas turbine engine 12 may rotate through a predetermined number of revolutions at the pressure and volumetric flow rate provided by the blower motor 22. In response to at least one shaft of the gas turbine engine 12 being rotated through the predetermined number of revolutions during the first time interval or the expiry of the first time interval, the controller 26 may command the blower motor 22 to cease operation. The blower motor 22 may cease operation for a second time interval. In response to an expiry of the second time interval, the controller 26 may command the blower motor 22 to operate and provide high pressure air to the air turbine starter 20 for another time interval. This process may continue at least until a temperature of the gas turbine engine 12 falls below a gas turbine engine threshold temperature.

The blower motor 22 may be operated by the controller 26 at least until a temperature of the gas turbine engine 12 achieves the predetermined temperature. In response to the temperature of the gas turbine engine 12 achieving or falling below the predetermined temperature, the controller 26 may command the blower motor 22 to cease operation. The controller 26 may command the control valve 24 to move towards the first position or the second position.

Figure 4:
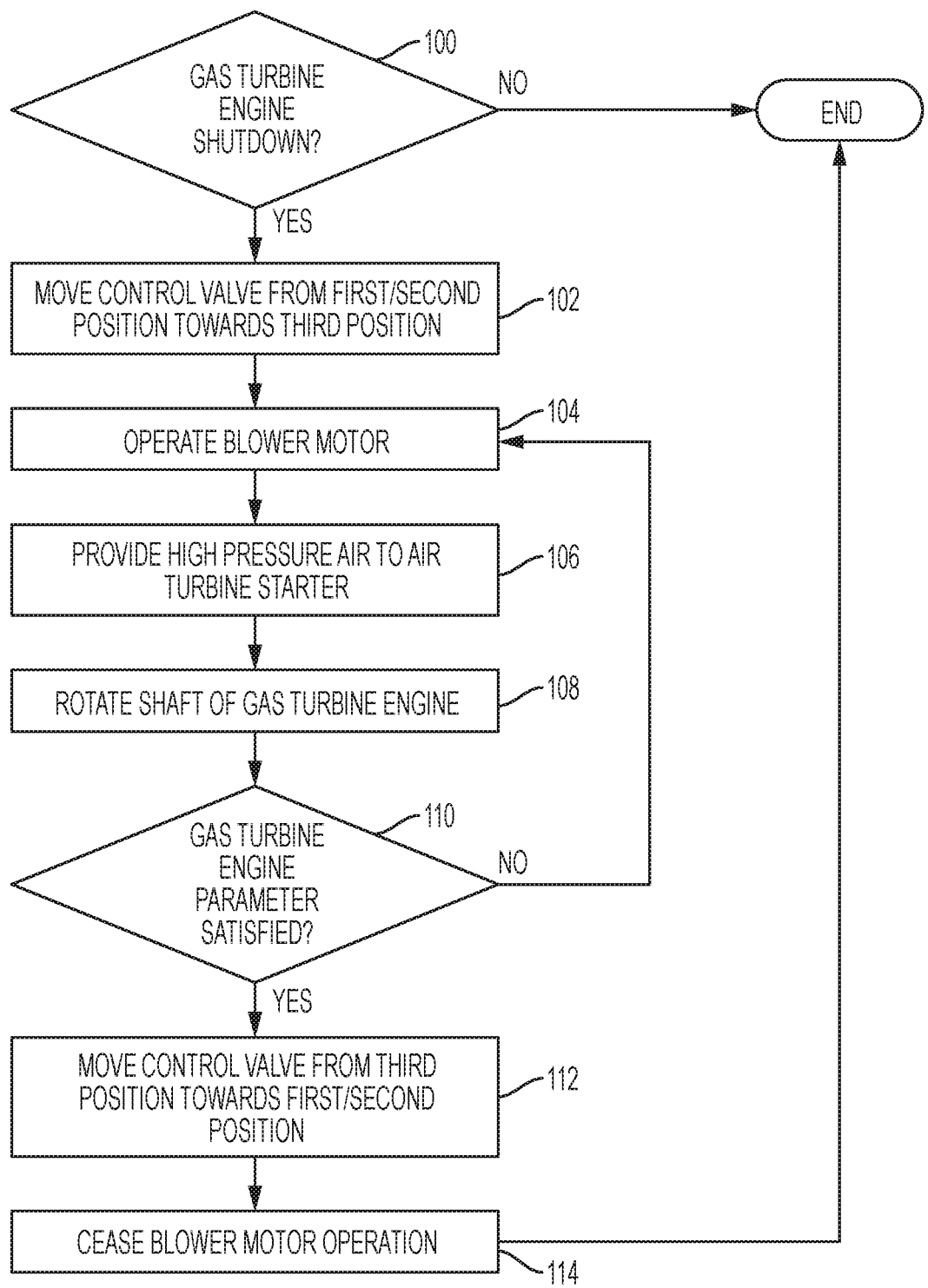
FIG. 4 is a flowchart illustrating a method of cooling a shaft of a gas turbine engine.

Referring to FIG. 4, a flowchart of an exemplary method of cooling a shaft of a gas turbine engine is shown. As will be appreciated by one of ordinary skill in the art, the flowchart represents control logic that may be implemented or affected in hardware, software, or a combination of hardware and software. For example, the various functions may be affected by a programmed microprocessor that is provided with the controller 26. The control logic may be implemented using any number of known programming and processing techniques or strategies that are not limited to the order or sequence illustrated. For instance, interrupt or event driven processing may be employed in real-time control applications rather than a purely sequential strategy is illustrated. Likewise, parallel processing, multitasking, or multi-threaded systems and methods may be used.

The method of cooling a shaft of a gas turbine engine may be executed by the controller 26 and may be implemented as a closed loop control system. For brevity, the method will be described in the context of a single method iteration.

At block 100, the method assesses whether the gas turbine engine 12 is shutdown. For example, a gas turbine engine shutdown may be indicated by various operating parameters associated with the gas turbine engine 12. The various operating parameters may include a gas turbine engine rotational speed being less than a threshold gas turbine rotational speed, a gas turbine engine temperature being greater than a threshold gas turbine engine temperature while the gas turbine engine rotational speed is less than the threshold gas turbine rotational speed, or a time since a gas turbine engine shutdown request has been received. If the gas turbine engine 12 is not shutdown, the method may end. Should the gas turbine engine 12 be shut down or a gas turbine engine shutdown request be received by the controller 26, the method may continue to block 102.

At block 102, the control valve 24 may be moved from a first position or a second position towards a third position. The third position inhibits fluid flow from the high pressure air source 30 to the air turbine starter 20 and enables fluid flow from the blower motor 22 to the air turbine starter 20.

At block 104, the blower motor 22 may be operated to provide high pressure air to the air turbine starter 20. The blower motor 22 may be operated at a predetermined operating point to provide a predetermined volumetric flow rate or predetermined pressure to the air turbine starter 20.

At block 106, the blower motor 22 provides the high pressure air to the air turbine starter 20. At block 108, the shaft 32 of the air turbine starter 20 rotates. The rotation of the shaft 32 of the air turbine starter 20 rotates at least one component of the gearbox 14 to rotate at least one shaft of the gas turbine engine 12.

At block 110, the method may assess whether a gas turbine engine parameter has been satisfied. The gas turbine engine parameter may include a gas turbine engine temperature becoming less than a threshold gas turbine engine temperature, a predetermined blower motor 22 operating duration being satisfied, or a number of operating cycles of the blower motor 22 being satisfied. If the gas turbine engine parameter has not yet been satisfied, the blower motor 22 would continue to be commanded to operate by the controller 26. Should the gas turbine engine parameter have been satisfied, the method may continue to block 112.

At block 112, the control valve 24 may be moved from the third position towards the first position or the second position. The movement of the control valve 24 from the third position towards the first position or the second position inhibits fluid flow from the blower motor 22 to the air turbine starter 20.

At block 114, operation of the blower motor 22 may be ceased and the method may end. The ceasing of blower motor 22 operation or the moving of the control valve 24 from the third position towards the first position or the second position leads to the cessation of rotation of at least one shaft of the gas turbine engine 12.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A system of a gas turbine engine, comprising:
an air turbine starter operably connected by at least one shaft to a gearbox that is configured to rotate the gas turbine engine;
a control valve fluidly connected to the air turbine starter;
a high pressure air source fluidly connected to the air turbine starter through the control valve and configured to cause the air turbine starter to rotate the at least one shaft; and
a blower motor that is electrically powered and fluidly connected to the air turbine starter through the control valve and configured to cause the air turbine starter to rotate the at least one shaft below a threshold operating rotational speed for the gas turbine engine, wherein the control valve is configured to selectively port airflow from the blower motor and the high pressure air source to the air turbine starter, the control valve being movable between:

a first position that fluidly disconnects the air turbine starter from both of the high pressure air source and the blower motor;

a second position that fluidly connects the air turbine starter with the high pressure air source and fluidly disconnects the air turbine starter flow from the blower motor; and a third position that fluidly connects the air turbine starter with the blower motor and fluidly disconnects the air turbine starter from the high pressure air source; and a controller in communication with the blower motor and the control valve, wherein, when the controller receives a gas turbine engine shutdown request, the controller is programmed to:

command the blower motor to operate; and command the control valve to move from one of the first position and the second position towards the third position to provide high pressure air to the air turbine starter to thereby cause the air turbine starter to rotate the at least one shaft below the threshold operating rotational speed for the gas turbine engine.

2. The system of claim 1, wherein the controller is configured to command the control valve to move from one of the first position or the second position towards the third position when at least one of a gas turbine engine rotational speed is less than a threshold gas turbine rotational speed, a gas turbine engine temperature is greater than a threshold gas turbine engine temperature, and a predetermined time period since gas turbine engine shutdown expires.

3. The system of claim 2, wherein the controller is further programmed to command the blower motor to cease operation and command the control valve to move towards the first position, in response to the gas turbine engine temperature being less than the threshold gas turbine engine temperature.

4. The system of claim 2, wherein the controller is further programmed to command the blower motor to cease operation and command the control valve to move towards the first position, in response to an expiry of the predetermined time period.

5. The system of claim 1, wherein the high pressure source is one of an aircraft pneumatic source, an auxiliary power unit, an external air cart, and a further aircraft engine.

6. The system of claim 1, wherein the high pressure source is an auxiliary power unit.

7. The system of claim 1, wherein the blower motor is configured to cause the air turbine starter to rotate the at least one shaft in a range of 0.1 and 10 revolutions per minute.

8. The system of claim 5, wherein the blower motor is configured to cause the air turbine starter to rotate the at least one shaft in a range of 0.1 and 10 revolutions per minute.

9. The system of claim 6, wherein the blower motor is configured to cause the air turbine starter to rotate the at least one shaft in a range of 0.1 and 10 revolutions per minute.

* * * * *